(12) United States Patent
Ju et al.

(10) Patent No.: US 11,780,216 B2
(45) Date of Patent: Oct. 10, 2023

(54) APPARATUS FOR MANUFACTURING DISPLAY DEVICE AND METHOD FOR MANUFACTURING DISPLAY DEVICE

(71) Applicant: Samsung Display Co., Ltd., Yongin-si (KR)

(72) Inventors: Tae Hun Ju, Seoul (KR); Sang Cheol Kim, Hwaseong-si (KR); Suk Ju Kang, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 171 days.

(21) Appl. No.: 17/147,299

(22) Filed: Jan. 12, 2021

(65) Prior Publication Data

US 2021/0347159 A1    Nov. 11, 2021

(30) Foreign Application Priority Data

May 8, 2020   (KR) ........................ 10-2020-0055408

(51) Int. Cl.
| | |
|---|---|
| *B32B 38/18* | (2006.01) |
| *B32B 37/18* | (2006.01) |
| *B32B 7/12* | (2006.01) |
| *B32B 27/08* | (2006.01) |

(52) U.S. Cl.
CPC ............ *B32B 38/1858* (2013.01); *B32B 7/12* (2013.01); *B32B 27/08* (2013.01); *B32B 37/182* (2013.01); *B32B 2457/202* (2013.01); *B32B 2457/206* (2013.01)

(58) Field of Classification Search
CPC ... B29C 65/78; B29C 65/7847; B25B 11/005; B32B 2310/14; B32B 2457/20; B32B 2457/202; B32B 2457/206; B32B 27/08; B32B 37/0046; B32B 37/12; B32B 37/182; B32B 38/1858; B32B 7/12
See application file for complete search history.

(56) References Cited

U.S. PATENT DOCUMENTS

| | | | |
|---|---|---|---|
| 9,498,938 B2 | 11/2016 | Son et al. | |
| 9,919,508 B2* | 3/2018 | Okamoto | ............... B32B 41/00 |
| 10,105,943 B2 | 10/2018 | Kim et al. | |
| 10,773,505 B2 | 9/2020 | Kim et al. | |
| 2004/0109124 A1 | 6/2004 | Masuda | |
| 2015/0231873 A1* | 8/2015 | Okamoto | .............. H01L 21/681 |
| | | | 156/64 |
| 2019/0322092 A1* | 10/2019 | Kim | ...................... B32B 37/025 |

(Continued)

FOREIGN PATENT DOCUMENTS

| | | | | |
|---|---|---|---|---|
| CN | 102543814 A | * | 7/2012 | ........... B25B 11/005 |
| KR | 10-2007-0016576 | | 2/2007 | |
| KR | 10-0694690 | | 3/2007 | |

(Continued)

*Primary Examiner* — Sonya M Sengupta
(74) *Attorney, Agent, or Firm* — H.C. Park & Associates, PLC

(57) ABSTRACT

An apparatus for manufacturing a display device and a method for manufacturing a display device. The apparatus for manufacturing a display device includes a frame; a guide member installed on the frame; a clamp including a pair of clamp members installed on the guide member; and a rotation unit configured to rotate the frame to change a relative position of each clamp member with respect to the frame. The clamp member includes a suction member.

8 Claims, 23 Drawing Sheets

(56) References Cited

U.S. PATENT DOCUMENTS

2021/0347159 A1\* 11/2021 Ju .................. B32B 37/182
2022/0281216 A1\* 9/2022 Kim ................ B32B 27/365

FOREIGN PATENT DOCUMENTS

| KR | 10-1139371 | 6/2012 |
| KR | 10-1185532 | 9/2012 |
| KR | 10-2014-0139361 | 12/2014 |
| KR | 10-2016-0127983 | 11/2016 |
| KR | 10-2019-0122281 | 10/2019 |

\* cited by examiner

APPARATUS FOR MANUFACTURING DISPLAY DEVICE AND METHOD FOR MANUFACTURING DISPLAY DEVICE

CROSS-REFERENCE TO RELATED APPLICATION

This application claims priority from and the benefit of Korean Patent Application No. 10-2020-0055408 filed on May 8, 2020, which is hereby incorporated by reference for all purposes as if fully set forth herein.

BACKGROUND

Field

Embodiments of the invention relate generally to an apparatus for manufacturing a display device and a method for manufacturing a display device.

Discussion of the Background

The importance of display devices has steadily increased with the development of multimedia technology. Accordingly, various types of display devices, such as an organic light emitting display (OLED), a liquid crystal display (LCD) and the like, have been used.

Typically, a display device includes a window, a display panel, and a plurality of functional films, which may be assembled with neighboring components. One of at least two adhesion target objects may have a surface covered with a heterogeneous film, which is peelable in the adhesion process and, once the heterogeneous film is removed, the heterogeneous film-removed object may become vulnerable to foreign substances, such as dust and shards. In the state where the adhesion target objects are exposed to the foreign substances, the adhesion of the target objects is likely to be defective, resulting in reduced reliability and degradation of display quality of the display device. There is, therefore, a need for an adhesion apparatus and method that is capable of stable and accurate adhesion.

The above information disclosed in this Background section is only for understanding of the background of the inventive concepts, and, therefore, it may contain information that does not constitute prior art.

SUMMARY

Embodiments of the invention provide an apparatus for manufacturing a display device that is capable of adhering materials in a stable and accurate manner.

Embodiments of the invention also provide a method for manufacturing a display device that is capable of adhering materials in a stable and accurate manner.

Additional features of the inventive concepts will be set forth in the description which follows, and in part will be apparent from the description, or may be learned by practice of the inventive concepts.

An embodiment of the invention provides an apparatus for manufacturing a display device, the apparatus including a frame; a guide member installed on the frame; a clamp including a pair of clamp members installed on the guide member; and a rotation unit configured to rotate the frame to change a relative position of each clamp member with respect to the frame, wherein the clamp member includes a suction member.

Another embodiment of the invention provides a method for manufacturing a display device, the method including arranging a first object on a sub-stage; sucking the first object to pick up the first object by means of a transfer unit; transferring the transfer unit into a chamber including a first main stage and a second main stage facing the first main stage; mounting the first object on the first main stage; arranging a second object on the sub-stage; sucking the second object to pick up the second object by means of the transfer unit; transferring the transfer unit into the chamber; mounting the second object on the second main stage; and adhering the first object and the second object. Each of the first object and the second object includes a lower surface, an upper surface opposite to the lower surface, and a side surface perpendicular to the lower surface and the upper surface, and the transfer unit does not contact the side surface of the first object and the side surface of the second object.

The apparatus for manufacturing a display device according to an embodiment is advantageous in terms of improving the reliability and display quality of a display device by adhering materials in a stable and accurate manner.

The method for manufacturing a display device according to an embodiment is advantageous in terms of improving the reliability and display quality of the display device by adhering materials in a stable and accurate manner.

It is to be understood that both the foregoing general description and the following detailed description are explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the inventive concepts.

DETAILED DESCRIPTION OF THE ILLUSTRATED EMBODIMENTS

The accompanying drawings, which are included to provide a further understanding of the invention and are incorporated in and constitute a part of this specification, illustrate embodiments of the invention, and together with the description serve to explain the inventive concepts.

It will also be understood that when a layer is referred to as being "on" another layer or substrate, it can be directly on the other layer or substrate, or intervening layers may also be present. In contrast, when an element is referred to as being "directly on" another element, there are no intervening elements present.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The same reference numbers indicate the same components throughout the specification.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, embodiments of the present disclosure will be described with reference to the accompanying drawings.

Figure 1:
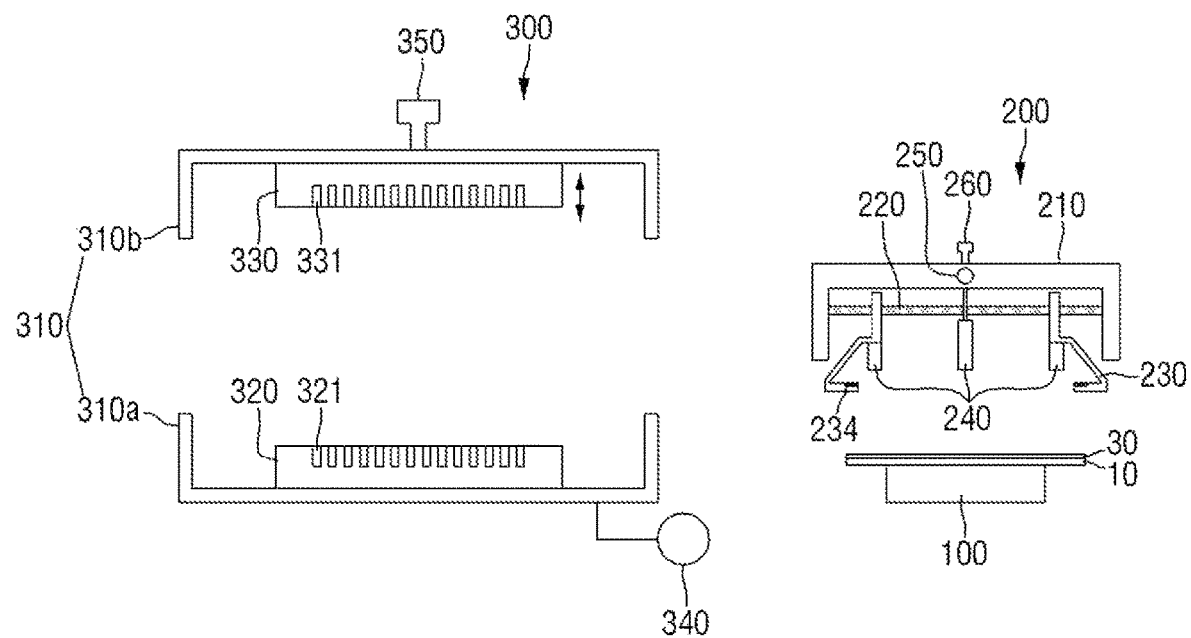
FIG. 1 is a schematic view illustrating an apparatus for manufacturing a display device according to an embodiment.
Figure 2:
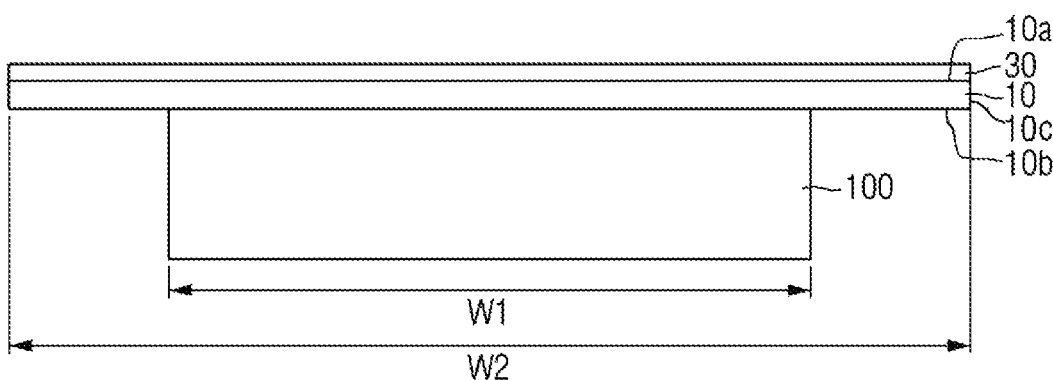
FIG. 2 is a schematic view showing a sub-stage according to an embodiment.
Figure 3:
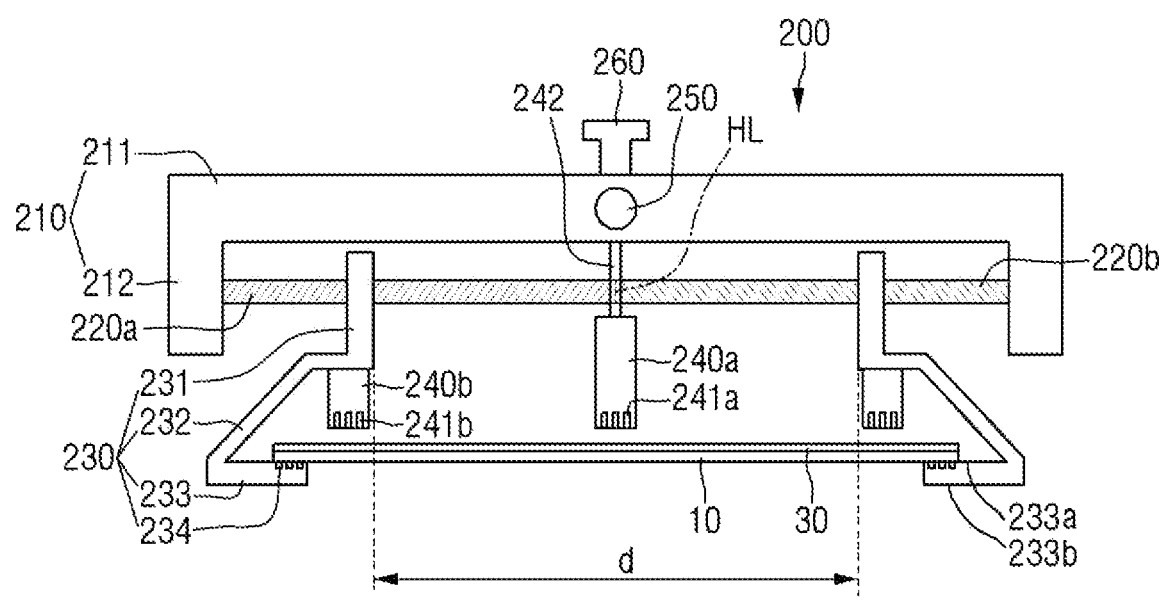
FIG. 3 is a schematic view showing a transfer unit according to an embodiment.
Figure 4:
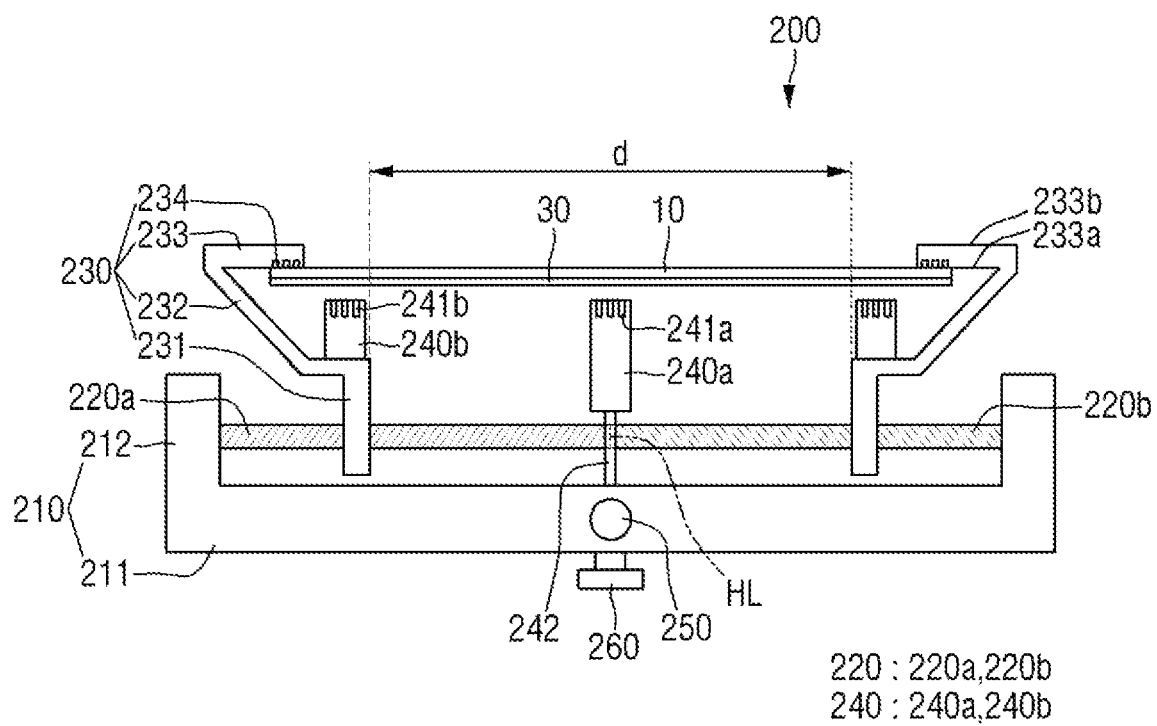
FIG. 4 is a schematic view illustrating the transfer unit of FIG. 3 rotated by 180°.
Figure 5:
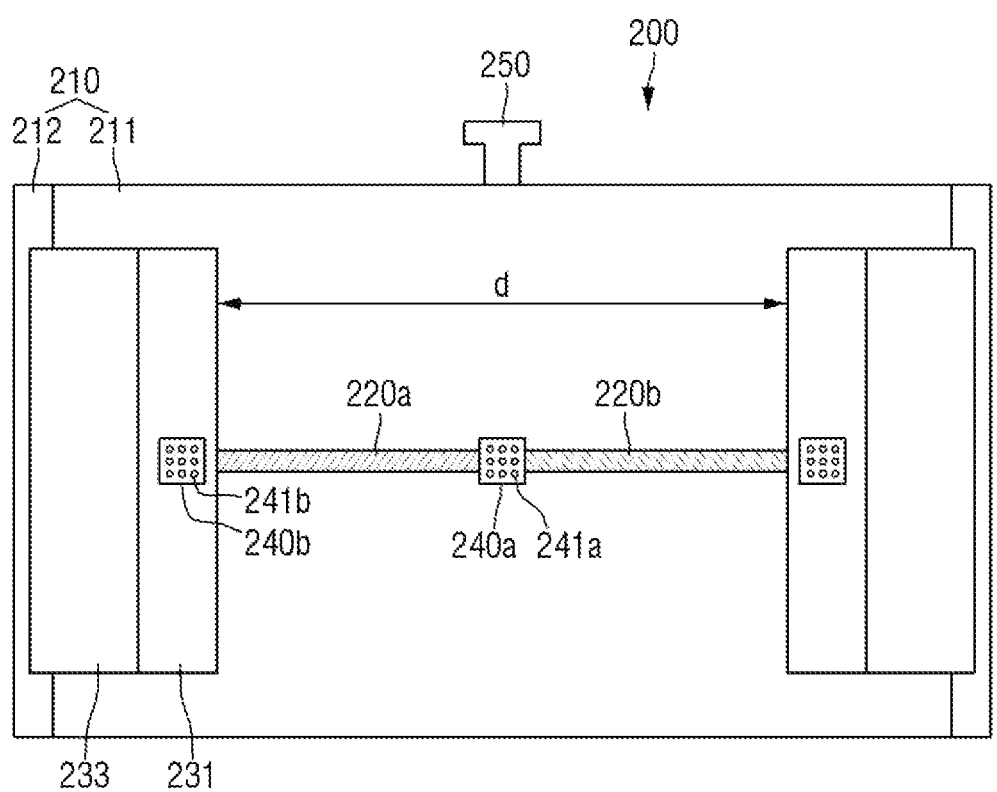
FIG. 5 is a bottom view of the transfer unit of FIG. 3.
Figure 6:
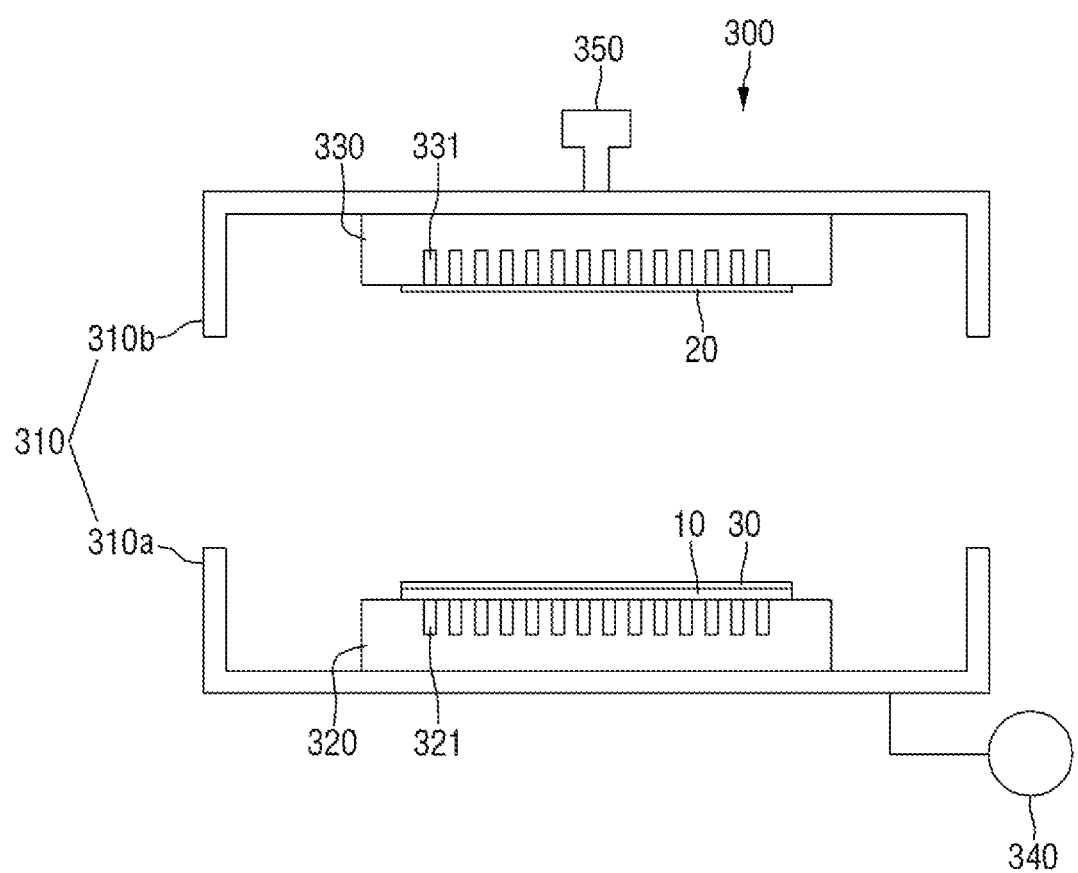
FIG. 6 is a schematic view showing a chamber according to an embodiment.
Figure 7:
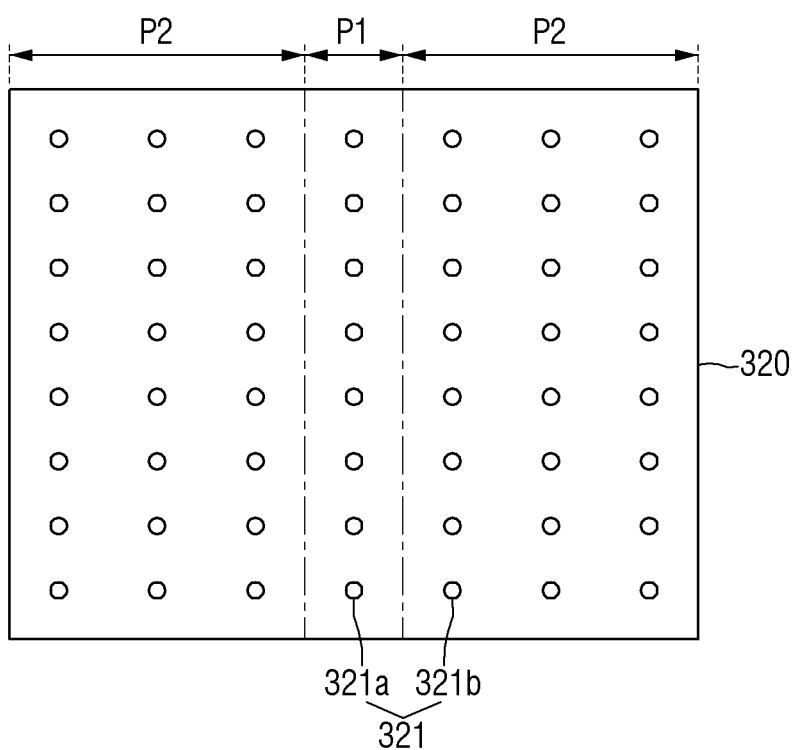
FIG. 7 is a plan view of a first main stage according to an embodiment

FIG. 1 is a schematic view illustrating an apparatus for manufacturing a display device according to an embodiment. FIG. 2 is a schematic view showing a sub-stage according to an embodiment. FIG. 3 is a schematic view showing a transfer unit according to an embodiment. FIG. 4 is a schematic view illustrating the transfer unit of FIG. 3 rotated by 180°. FIG. 5 is a bottom view of the transfer unit of FIG. 3. FIG. 6 is a schematic view showing a chamber according to an embodiment. FIG. 7 is a plan view of a first main stage according to an embodiment.

In reference to FIGS. 1 to 7, the apparatus for manufacturing a display device according to an embodiment may include a sub-stage 100, a transfer unit 200, and a chamber 300. The apparatus for manufacturing a display device according to an embodiment may be an apparatus for adhering a first object 10 and a second object 20 together. In detail, the apparatus for manufacturing a display device according to an embodiment may be an apparatus for placing the first and second objects 10 and 20 on the sub-stage 100, transferring the first and second objects 10 and 20 to the changer 300 by means of the transfer unit 200, and adhering one surface of the first object 10 to one surface of the second object 200.

Here, at least one of the one surface of the first object 10 and the one surface of the second object 20 may be covered with an adhesive layer 30 for adhesion. Although the description is directed to the case where the adhesive layer 30 is arranged on one surface of the first object 10, the inventive concept is not limited thereto, and the adhesive layer 30 may be arranged on one surface of the second object 20. The adhesive layer 30 may be, but is not limited to, at least one of an acrylic adhesive, a silicon adhesive, and an acid-free hydroxyl-containing adhesive.

In the case where one of the first and second objects 10 and 20 has adhesiveness in itself, the adhesive layer 30 may be omitted. For example, if one of the first and second objects 10 and 20 is an optically clear adhesive (OCA) film or the like, the adhesive layer 30 may be omitted.

In an embodiment, the first and second objects 10 and 20 may be, but is not limited to, one of functional films such as an optically clear adhesive (OCA) film, a protection film, a touch member, a polarizing plate, a display panel, and a window constituting a display device, and they may be made of a different flexible material. Although the description is directed to the case where the first and second objects 10 and 20 are transferred by the same transfer unit 200, the inventive concept is not limited thereto, and the first and second objects 10 and 20 may be transferred by different transfer units 200.

Although the following description made with reference to FIGS. 1 to 7 is directed to the case where the first object 10 is transferred to a first main stage 320 and the second object 20 is transferred to a second main stage 330, it may also be possible for the first object 10 to be transferred to the second main stage 330 and the second object 20 to be transferred to the first main stage 320. Although the description is also directed to the case where the first object 10 is loaded on the sub-stage 100 to be transferred to the first main stage 320 by the transfer unit 200, the inventive concept also includes the case where the second object 20 is transferred to the second main stage 330.

On the sub-stage 100 included in the apparatus for manufacturing a display device according to an embodiment, the first object 10 may be loaded to be transferred to the chamber 300. The sub-stage 100 may have a flat plate shape. The sub-stage 100 may support an object as the target of a manufacturing or inspection process. The sub-stage 100 may be arranged outside the chamber 300, to be described later.

The first object 10 arranged on the sub-stage 100 may include a first upper surface 10a, a first lower surface 10b, and a first side surface 10c perpendicular to the first upper surface 10a and the first lower surface 10b. The first upper surface 10a may be a surface in contact with the adhesive layer 30. The first lower surface 10b may be a surface opposite to the first upper surface 10a and in contact with the sub-stage 100. Although arranged on the first object 10, the adhesive layer 30, without being limited thereto, may be omitted.

The sub-stage 100 may have a width less than that of the first object 10. For example, assuming that the sub-stage 100 and the first object 10 have a first width W1 and a second width W2, respectively, as shown in FIG. 2, the first width W1 may be less than the second width W2. Accordingly, the first object 10 may be partially overlapped with the sub-stage 100, and the first lower surface 10b may partially contact the sub-stage 100.

The first object 10 placed on the sub-stage 100 may be picked up by the transfer unit 200. The first object 10 may be placed such that the both ends of the first object 10 are protruded outside the both ends of the sub-stage 100, which facilitates the first object 10 being picked up by the transfer unit 200. In detail, the first object 10 may be easily picked up by the transfer unit 200 in such a way of supporting part of the first lower surface 10b that is exposed without contact with the sub-stage 100. Here, the first side surface 10c of the first object 10 may not be held by the transfer unit 200. That is, the first side surface 10c of the first object 10 may be exposed to the outside without contact with the transfer unit 200. This may make it possible to prevent the first object 10 from being transformed in shape when the first object 10 is picked up by the transfer unit 200.

The transfer unit 200 may pick up the first object 10 placed on the sub-stage 100 and transfer the first object 10 to another position. For example, the transfer unit 200 may transfer the first object 10 placed on the sub-stage 100 to the inside of the chamber 300, which is described later.

The transfer unit 200 may include a frame 210, a guide member 220, a clamp 230, an air blower 240, and a rotation unit 250.

The frame 210 may give the outward appearance of the transfer unit 200 and connect the guide member 220, the clamp 230, the air blower 240, the rotation unit 250, and a clamp driving member 260 to each other. The frame 210 may include a horizontal frame 211 having a flat plate shape and a vertical frame 212 formed by bending the horizontal frame 211 at both ends thereof to be extended. The horizontal frame 211 may remain substantially parallel to the sub-stage 100 while the first object 10 placed on the sub-stage 100 is picked up by the transfer unit 200.

The guide member 220 may be mounted on the frame 210. In detail, the guide member 220 may be mounted on the vertical frame 212 of the frame 210. The guide member 220 may guide the clamp 230, which is described later. That is, the clamp 230 may be mounted on the guide member 220 to move along the guide member 220. The guide member 220 may be extended in a particular direction. The guide member 220 may be arranged so as to be spaced apart from the horizontal frame 211. The guide member 220 may be connected to the center of the vertical frame 212 so as to divide the horizontal frame 211 in half in a plan view.

The guide member 220 may have a screw-threaded outer circumference surface. The guide member 220 may include a first guide member 220*a* arranged at one side of a virtual line HL dividing the guide member 220 in half in its longitudinal direction and a second guide member 220*b* arranged at the other side. The first and second guide members 220*a* and 220*b* separated by the virtual line HL of the guide member 220 may have respective screw threads formed on the outer circumference thereof in a symmetrical manner. As to be described later, the screw threads formed on the outer circumference surfaces of the first and second guide member 220*a* and 220*b* are symmetrical such that both members of the clamp 230 may move in opposite directions when the guide member 220 rotates.

The clamp 230 may include a pair of oppositely facing clamping members connected to guide member 220. The clamp 230 may be connected to the guide member 230 and may include coupling members 231 each having a flat plate shape perpendicular to the guide member 220, and connecting members 232 extended downward and outward from the bottom ends of the respective coupling members 231, and mounting members 233 extended inward from the outer ends of the coupling members 232.

The coupling members 231 of the clamp 230 may each include a coupling hole (not shown) for coupling with the guide member 220. The inner circumference surface of the coupling hole has a screw thread engaged with the corresponding screw thread formed on the outer circumference surface of the guide member 220. The distance between the inner surfaces of the oppositely facing coupling members 231 of the clamp 230 may defined as a clamp separation distance d. As described above, the clamp separation distance d may be adjusted by rotation of the guide member 220. For example, the clamp separation distance d may increase as the guide member 220 rotates in one direction and decrease as the guide member 220 rotates in the opposite direction. As to be described later, an air blower 240*b* may be arranged on the bottom surface of each of the coupling members 231 of the clamp 230.

The connecting members 232 of the clamp 230 may connect the coupling members 231 and the mounting members 233. Although the connecting members 232 are formed so as to be extended outward and downward in the embodiment, the inventive concept is not limited thereto.

The mounting members 233 may each include a first surface 233*a* facing the guide member 220 and a second surface 233*b* opposite to the first surface 233*a*. If the first object 10 is loaded on the transfer unit 200, both ends of the first object 10 are mounted on the first surface 233*a* of the mounting members 233. The first surface 233*a* of the mounting members 233 may partially contact the first lower surface 10*b* of the first object 10.

The mounting members 233 may each include a transfer suction member 234. The transfer suction member 234 may be arranged further away than the coupling member 231 from the frame 210. The transfer suction member 234 may be arranged on the first surface 233*a* of the mounting member 233. The transfer suction member 234 may suck and hold the first lower surface 10*b* of the first object 10 that partially contact the first surface 233*a* of the mounting members 233 to thereby fix the first object 10 to the transfer unit 200. In an Embodiment, the transfer suction member 234 may include suction holes connected to a vacuum unit (not shown) for producing a negative pressure. The mounting members 233 may stably fix the first object 10 with the negative pressure produced by the transfer suction members 243. The first upper surface 10*a* and the first side surface 10*c* of the first object 10 may not contact the clamp 230.

The air blowers 240 may be arranged on the bottom parts of the horizontal frame 211 and the coupling members 231 of the clamp 230. The air blowers 240 may be connected to an air supply device (not shown) outside the transfer unit 200 to blow the air. The air blown by the air blowers 240 may make the first object 10 supported by the mounting members 233 bend toward the air-blowing direction. The air blown by the air blowers 240 may be, but is not limited to, atmospheric air or pure nitrogen gas.

The air blowers 240 may be arranged further away than the guide member 220 from the frame 210. The air blowers 240 may include a first air blow 240*a* connected to the horizontal frame 211 and second air blowers 240*b* connected to the bottom parts of the coupling members 231 so as to move along the clamp 230. The first air blower 240*a* may be connected to the horizontal frame 211 by means of a shaft 242. The second air blowers 240*b* may be directly connected to the bottom part of the clamp 230 or via a connecting member (not shown), such as the shaft 242 as aforementioned.

The air blowers 240*a* and 240*b* may include respective air outlets 241*a* and 241*b*. That is, the first air blower 240*a* may include the first air outlet 241*a*, and the second air blowers 240*b* may include the second air outlet 241*b*. Although the description is directed to the case where blowers 240*a* and 240*b* blow air streams equal in pressure, the inventive concept is not limited thereto, and the blowers 240*a* and 240*b* may blow the air streams to produce different pressures.

The rotation unit 250 may be arranged on one side of the frame 210 of the transfer unit 200. In an embodiment, the rotation unit 250 may include a rotation shaft and may be connected to an external motor (not shown) to enable the transfer unit 200 to rotate. The transfer unit 200 may be rotated by the rotation unit 250. The rotation unit 250 may rotate the frame 210 to change the relative position of the clamp 230 with respect to the frame 210. In detail, the rotation unit 250 may rotate the frame 210 on a plane perpendicular to the longitudinal direction of the guide member 220. As shown in FIG. 4, the transfer unit 200 may be rotated by 180° by the rotation unit 250 such that the frame 210 is arranged downward and the first object 10 loaded on the transfer unit 200 is arranged upward. Even in this case, the first object 10 may remain stably fixed on the transfer unit 200 by the negative pressure produced by the transfer suction member 234.

The clamp driving member 260 may be arranged on the top part of the horizontal frame 211. The clamp driving member 260 may rotate the above-described guide member 220 to move the clamping members of the clamp 230. The clamp driving member 260 may be an adjustment means for adjusting the clamp separation distance d. As the guide member 220 is rotated by the clamp driving member 260, the paired clamping members of the clamp 230 may move in opposite directions. For example, the guide member 220 may rotate in one direction to move the clamping members of the clamp 230 in a way of increasing the clamp separation distance d, and may rotate in the opposite direction to move the clamping members of the clamp 230 in a way of decreasing the clamp separation distance d.

The first object 10 may be transferred to the chamber 300 by the transfer unit 200. The chamber 300 may provide a space in which the first object 10 and the second object 20 are processed. For example, the chamber 300 may provide a space for performing a process of mutually adhering the first object 10 and the second object 20. The chamber 300 may include a chamber cover 310, a first main stage 320, a second main stage 330, a vacuum module 340, and a stage cylinder 350.

The chamber cover 310 may provide an inner space accommodating the first main stage 320 and the second main stage 330. The chamber cover 310 may include a first chamber cover 310a arranged downward and a second chamber cover 310b arranged upward. The first chamber cover 310a and the second chamber cover 310b may be spaced apart from each other or fastened to each other. In the case where the first chamber cover 310a and the second chamber cover 310b are spaced apart from each other, the first and second objects 10 and 20 may be brought in and out of the space between the first chamber cover 310a and the second chamber cover 310b. In the case where the first chamber cover 310a and the second chamber cover 310b are fastened to each other, the space inside the chamber 300 may be sealed from the outside. However, the inventive concept is not limited thereto, and the chamber cover 310 may be structured to have a door (not shown) capable of being opened and closed.

The first main stage 320 and the second main stage 330 may be arranged in the inner space of the chamber 300. The first and second main stages 320 and 330 may each support and fix the target object to be processed in the chamber 300. For example, the first main stage 320 may support and fix the first object 10 for the adhesion process, and the second main stage 330 may support and fix the second object 20 to be adhered with the first object 10. However, the inventive concept is not so limited. On the contrary, the second main stage 330 may support and fix the first object 10, and the first main stage 320 may support and fix the second object 20 to be adhered with the first object 10.

The first main stage 320 may have a flat plate shape, but is not limited thereto, and may have a convex or concave shape. The first main stage 320 may fix the first object 10 on the upper surface thereof. The first main stage 320 may include a plurality of first suction holes 321 for vacuum-sucking the first object 10. The plurality of first suction holes 321 may be connected to a vacuum unit such as a vacuum pump, and the first object 10 may be vacuum-adhered to the upper surface of the first main stage 320 via the plurality of first suction holes 321 connected to the vacuum unit. The first main stage 320 may move up and down.

The second main stage 330 may be arranged to face the first main stage 320. The second main stage 330 may have the same flat plate shape as the first main stage 320, but is not limited thereto and may have a convex or concave shape. The second main stage 330 may fix the second object 20 on the lower surface thereof facing the first main stage 320. The second main stage 330 may include a plurality of second suction holes 331 for vacuum-adhering the second object 20. The plurality of second suction holes 331 may be connected to a vacuum unit, such as a vacuum pump, and the second object 20 may be vacuum-sucked to the lower surface of the second main stage 330 via the plurality of second suction holes 331 connected to the vacuum unit. Although the description is made of the embodiment in which the main stages 320 and 330 fix the first object 10 and the second object 20 in a vacuum suction manner, the inventive concept is not limited thereto, and the first object 10 or the second object 20 may be fixed in various ways, such as using an adhesive chuck or an electrostatic chuck.

The first main stage 320 may include a center part P1 and peripheral parts P2 between the center part P1 and the edges thereof. The center part P1 may be defined as an area having a strap shape crossing the center of the first main stage 320, and the peripheral parts P2 may be defined as two areas remaining after definition of the center part P1 and separated by the center part P1.

The plurality of first suction holes 321 may be arranged on the first main stage 320. Although it is depicted in FIG. 7 that the plurality of the first suction holes 321 are arranged in parallel in columns and rows, the inventive concept is not limited thereto, and the plurality of the first suction holes 321 may be dislocated with each other in a longitudinal or transverse direction, or in a zigzag form. The plurality of first suction holes 321 may include a plurality of first center suction holes 321a formed in the center part P1 and a plurality of first peripheral suction holes 321b formed in the peripheral parts P2.

The clamping members of the clamp 230 may move close to each other while the first object 10 is mounted on the first main stage 320 such that the first object 10, in the state of being bent, contacts, from its center part, the upper surface of the first main stage 320. Particularly, the center part of the first object 10 may contact the plurality of the first center suction holes 321a arranged in the center part P1 of the first main stage 320. Here, the vacuum unit connected to the plurality of the first center suction holes 321a may operate such that the center part of the first object 10 is vacuum-adhered to the first main stage 320.

Next, the vacuum unit connected to the plurality of the first peripheral suction holes 321b may operate while the two clamping members of the clamp 230 move away from each other such that the first object 10 is vacuum-sucked to the first main stage 320 in the order from the center part to the edge of the first object 10. This makes it possible to prevent any air bubble from being trapped between the first main stage 320 and the first object 10, which leads to improvement of adhesiveness between the first main stage 320 and the first object 10.

Although the description herein is directed to the case where the second main stage 330 is identical in structure with the first main stage 320 such that the second object 20 is mounted in the same manner as the first object 10 being mounted on the first main stage 320, the inventive concept is not limited thereto.

Although not shown, the apparatus for manufacturing a display device according to an embodiment may further include, for example, an elastic sheet or a pressing pad arranged above the first main stage 320 to press the first object 10 and the second object 20 during the adhesion process.

The second main stage 330 may be driven by the stage cylinder 350 so as to move in the vertical direction. The stage cylinder 350 may be arranged on top of the second chamber cover 310*b*, but the inventive concept is not limited thereto. In an embodiment, after the first and second objects 10 and 20 are respectively arranged on the first and second main stages 320 and the second main stage 330, the second main stage 330 may be moved down to the first main stage 320 by the stage cylinder 350 such that the first and second objects 10 and 20 adhere to each other. The adhesive layer 30 may be interposed between the first object 10 and the second object 20, and it may be omitted as in the case described above.

It may be necessary to control the inner space of the chamber cover 310 to remain in the vacuum state during the process of adhering the first and second objects 10 and 20. Here, the vacuum state may mean a state of having a pressure low enough to stably perform the adhesion process rather than the complete vacuum state. The inner space of the chamber cover 310 may remain in the vacuum state generated by the vacuum module 340 arranged outside the chamber cover 310. The vacuum module 340 may operate after the inner space of the chamber cover 310 is sealed from the outside. As described above, the inner space of the chamber cover 310 may be sealed from the outside in such a way that the first chamber cover 310*a* and the second chamber cover 310*b* are mutually connected.

In the apparatus for manufacturing a display device according to an embodiment, the transfer unit 200 may stably transfer the first object 10 and the second object 20 from the sub-stage 100 to the chamber 300. The first object 10 and the second object 20 transferred to the inside of the chamber 300 may be accurately adhered together. This may improve the reliability and display quality of the display device including the mutually adhered first and second objects 10 and 20.

Figure 8:
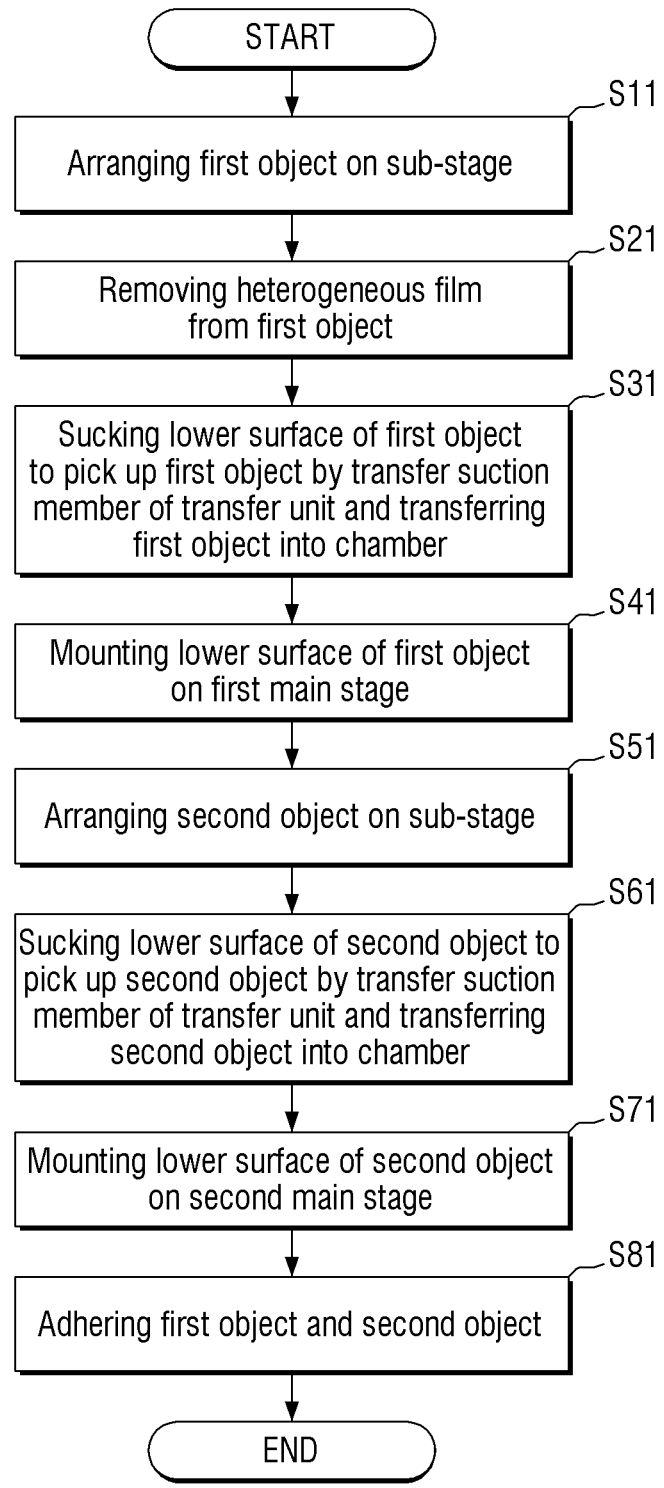
FIG. 8 is a flowchart showing a method of manufacturing a display device according to an embodiment.

FIG. 8 is a flowchart showing a method of manufacturing a display device according to an embodiment. FIGS. 9 to 21 are schematic views illustrating a method of manufacturing a display device according to an embodiment.

In reference to FIGS. 8, the method for manufacturing a display device may include arranging the first object on the sub-stage at step S11, removing the heterogeneous film from the first object at step S21, sucking the lower surface of the first object to pick up the first object by means of the transfer suction member of the transfer unit and transferring the first object into the inside of the chamber at step S31, mounting the lower surface of the first object on the first main stage at step S41, arranging the second object on the sub-stage at step S51, sucking the lower surface of the second object to pick up the second object by means of the transfer suction member of the transfer unit and transferring the second object into the inside of the chamber at step S61, mounting the lower surface of the second object on the second main stage at step S71, and adhering the first object and the second object at step S81.

Figure 9:
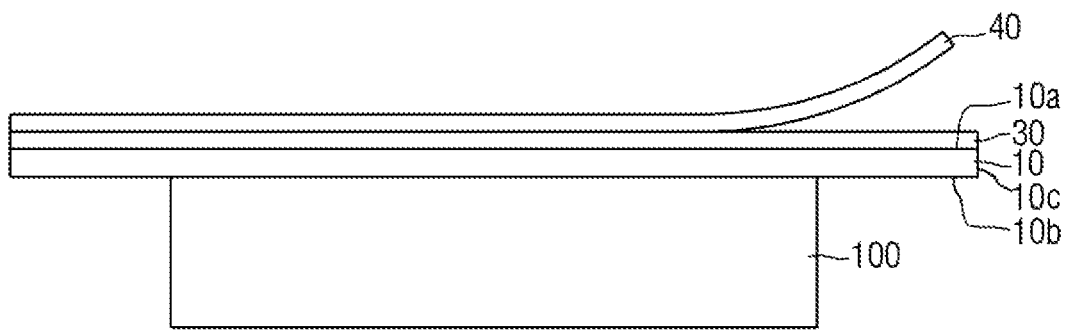
FIGS. 9, 10, 11, 12, 13, 14, 15, 16, 17, 18, 19, 20, and 21 are schematic views illustrating a method of manufacturing a display device according to an embodiment.
Figure 10:
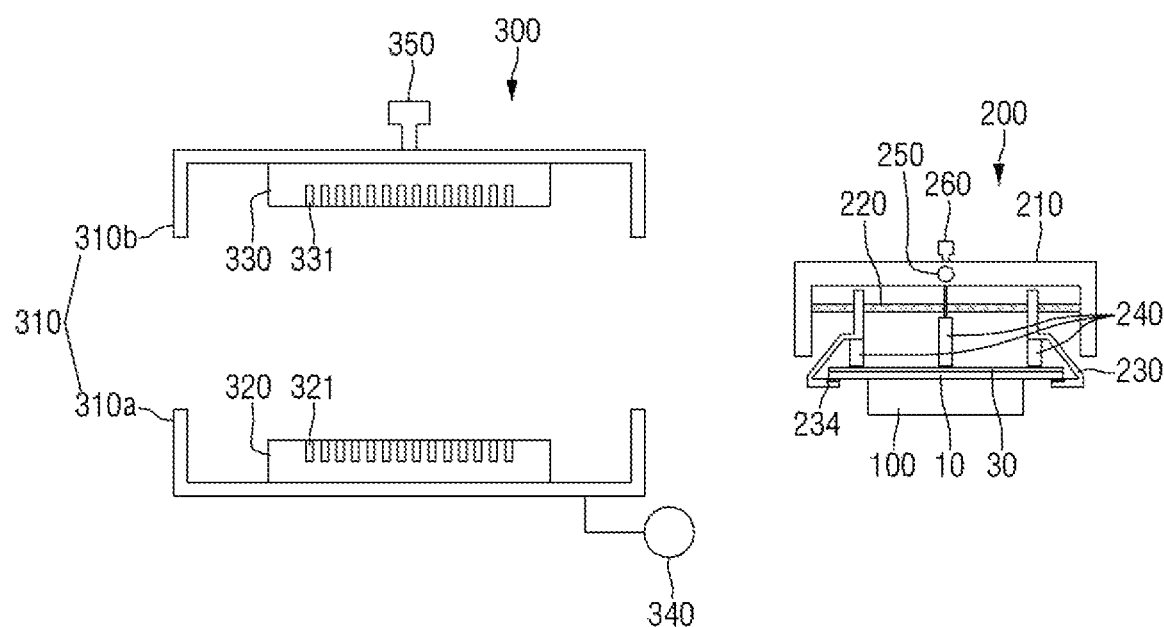
Figure 11:
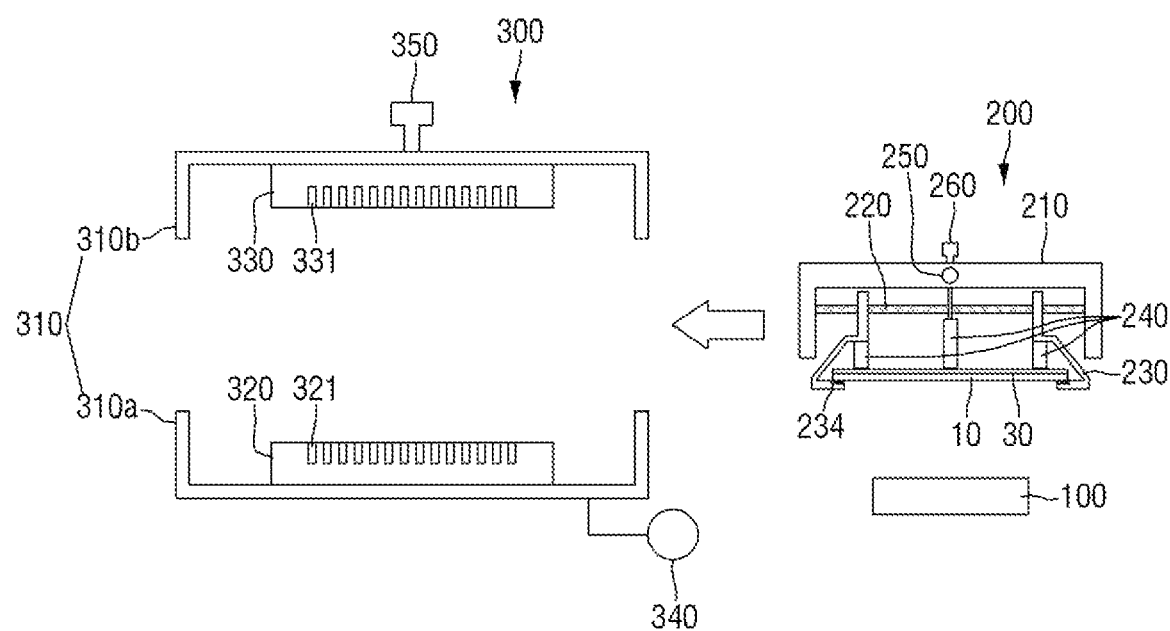
Figure 12:
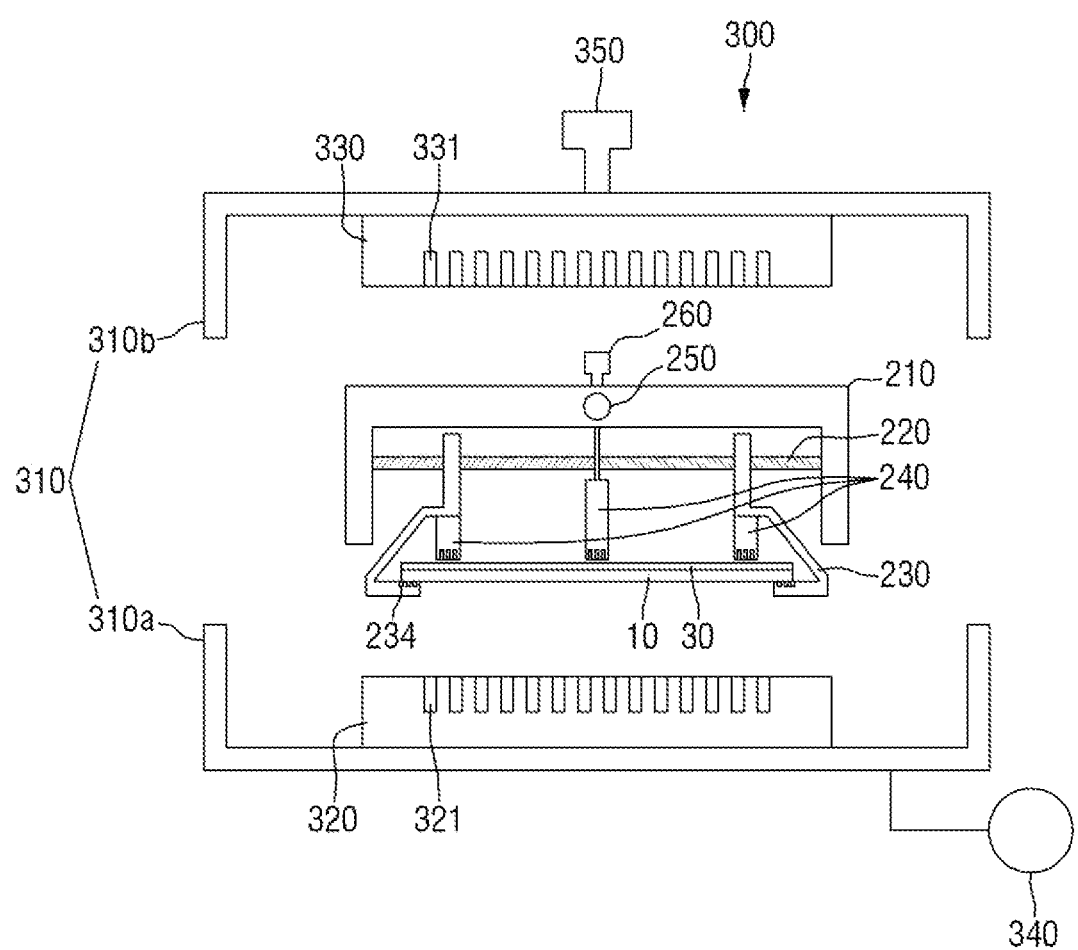

In reference to FIGS. 8 and 9, the method for manufacturing a display device according to an embodiment may include arranging the first object 10 on the sub-stage 100. The adhesive layer 30 may be arranged on the first object 10. The detailed description thereof has been made with reference to FIGS. 1 to 7 and is omitted hereinafter. A heterogeneous film 40 may be arranged on the adhesive layer 30. The heterogeneous film 40 may prevent the first object 10 from dust, shards, moisture, and other contaminants before the first object 10 is loaded into the adhesion process. Typically, the heterogeneous film 40 may be arranged on the adhesive layer 30 of the first object 10 and peeled off immediately before adhesion of the first object. For example, the heterogeneous film 40 may be, but is not limited to, a film produced by mixing or layering one or two or more films such as a polyethylene film, a polypropylene film, an ethylene vinyl acetate copolymer film, a polyvinyl chloride film, a polyvinylidene chloride film, a polystyrene film, a polycarbonate film, a polyamide film, a polyethylene terephthalate film, a polyvinyl alcohol film, a polyurethane film, a polytetrafluoroethylene film, and an acrylic film. The heterogeneous film 40 may also be heterogeneously processed with alkyd powder, fluorine powder, unsaturated ester powder, polyolefin or wax powder, silicon power, or the like.

Arranging the first object 10 on the sub-stage 100 at step S11 may be followed by removing the heterogeneous film 40 from the first object 10 at step S21. The heterogeneous film 40 may be removed, using a peeling tape, from the first object 10. The heterogeneous film 40 may also be removed from the first object 10 with a peeling unit (not shown) including a peeling roller, a gripper, or an absorber. The heterogeneous film 40 may also be manually removed from the first object 10 by hand.

Before removing the heterogeneous film 40 from the first object 10, a process for cleansing the first object 10 to which the heterogeneous film 40 is attached may be performed. Removing the heterogeneous film 40 after cleansing the first object 10 to which the heterogeneous film 40 is attached makes it possible to minimize generation of foreign substances such as dust and shards while peeling the heterogeneous film 40 from the first object 10. After the heterogeneous film 40 is removed from the first object 10, the plasma process may be carried out. Carrying out the plasma process on the first object 10 from which the heterogeneous film 40 has been removed may improve the adhesiveness of the exposed adhesive layer 30.

In reference to FIGS. 8 and 10 to 12, removing the heterogeneous film 40 from the first object 10 at step S21 may be followed by sucking the lower surface of the first object to pick up the first object by means of the transfer suction member of the transfer unit and transferring the first object into the inside of the chamber at step S31.

The frame 210 of the transfer unit 200 may move down, and the two clamping members of the clamp 230 may move in the opposite directions along the guide member 220. As described above, the sub-stage 100 may have a width less than that of the first object 10 such that both ends of the first object 10 are protruded outside the both ends of the sub-stage 100, which facilitates the first object 10 placed on the sub-stage 100 being picked up by the transfer unit 200.

When the first object 10 is picked up by the transfer unit 200, the clamp 230 of the transfer unit 200 may contact only the first lower surface 10b of the first object 10 and may not contact the first upper surface 10a and the first side surface 10c. Accordingly, the first upper surface 10a and the first side surface 10c of the first object 10 may be exposed to the outside without contact with the clamp 230.

Removing the heterogeneous film 40 may expose the adhesive layer 30 arranged on the first object 10 to the outside. If the transfer unit 200 contacts the adhesive layer 30 exposed to the outside, this may contaminate the adhesive layer 30, resulting in defective adhesion in the follow-up adhesion process. In order to avoid this problem, the first clamp 230 may directly contact only the lower surface 10b of the first object 10 without contacting the exposed surface of the adhesive layer 30 during the transfer of the first object 10.

After picking up the first object 10, the transfer unit 200 may enter into the inside of the chamber 300 through the space between the first chamber cover 310a and the second chamber cover 310b. The first object 10 transferred into the chamber 300 may be mounted on the first main stage 320.

Figure 13:
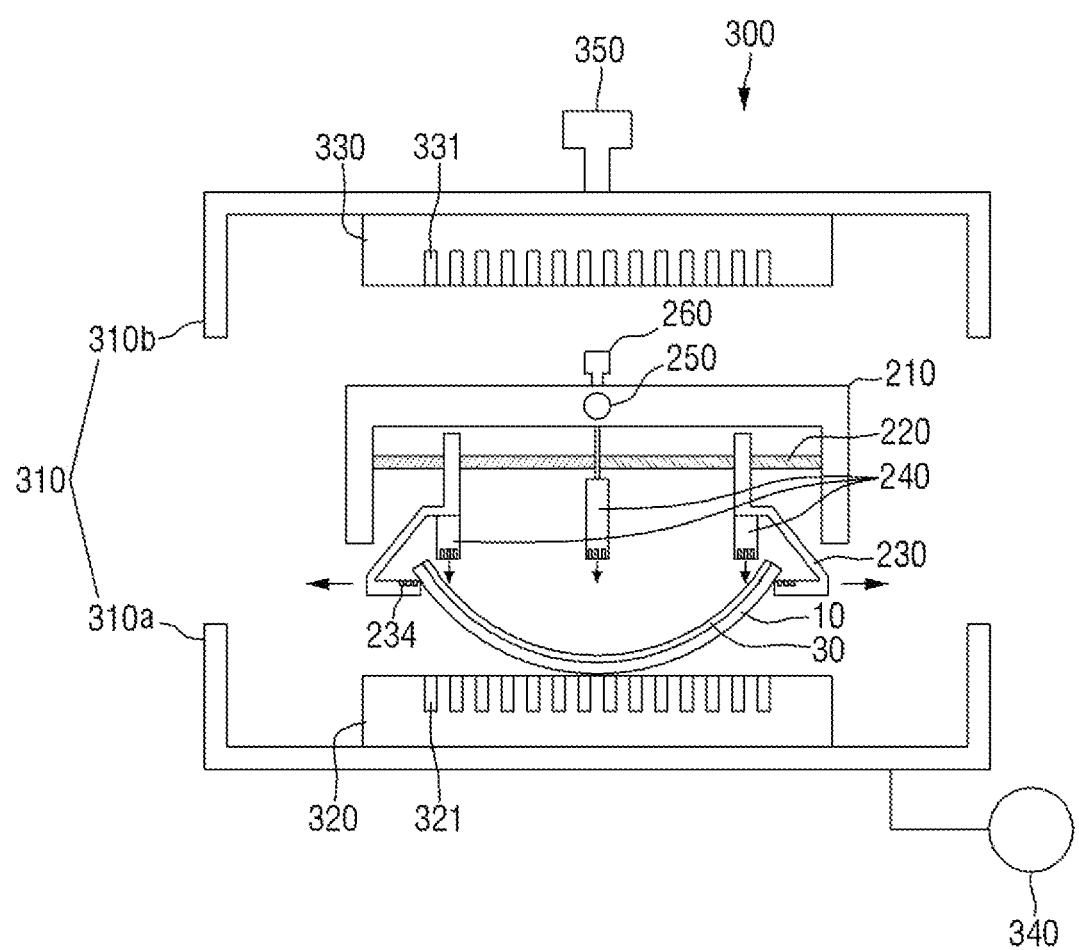
Figure 14:
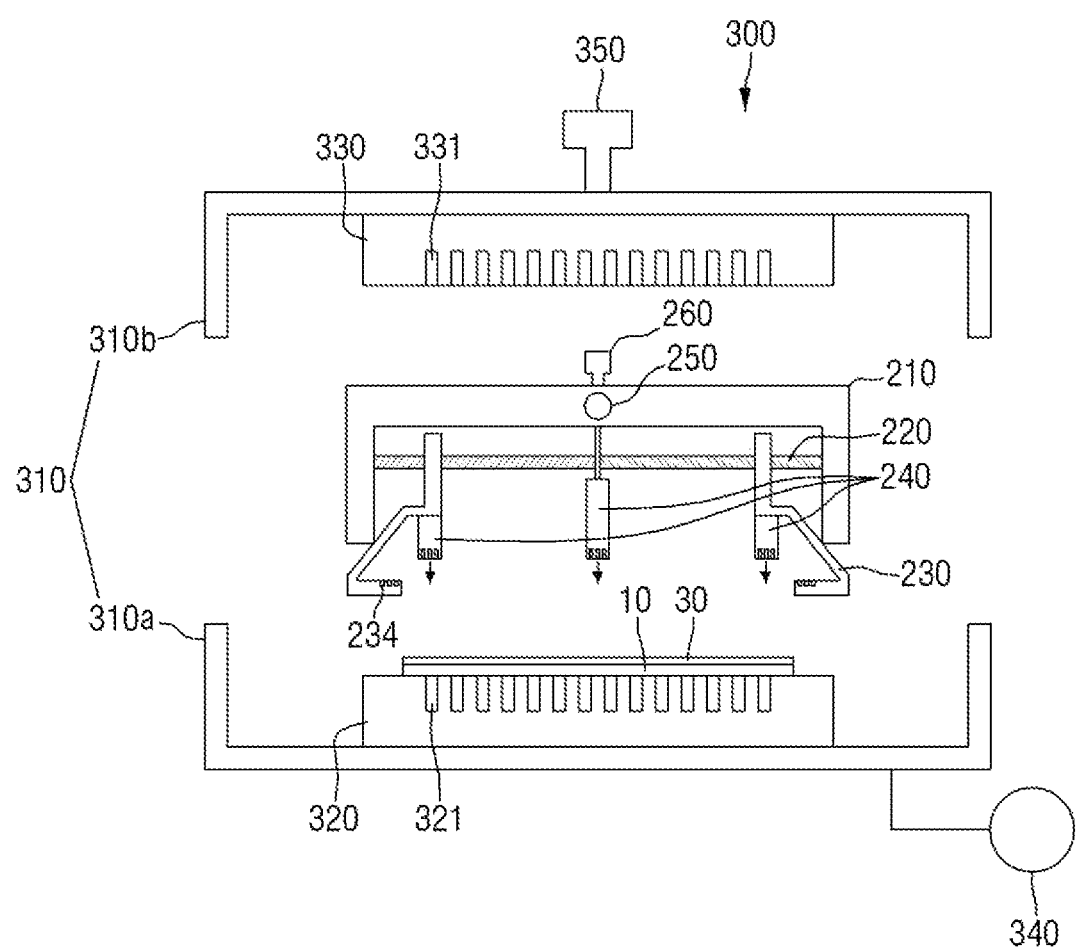

In reference to FIGS. 8, 13, and 14, sucking the lower surface of the first object to pick up the first object by means of the transfer suction member of the transfer unit and transferring the first object into the chamber at step S31 may be followed by mounting the lower surface of the first object on the first main stage at step S41.

Mounting the lower surface 10b of the first object 10 on the first main stage 320 at step S41 may include decreasing the clamp separation distance d, blowing air to the first object 10 by means of the air blow 240, sucking the center part of the first object 10 by means of the first center suction holes 321a to mount the first object 10 on the first main stage 320, releasing the negative pressure produced by the transfer suction member 234, increasing the clamp separation distance d, blowing air to the first object 10 by means of the air blow 240, and sucking the peripheral part of the first object 10 by means of the first peripheral suction holes 321b to mount the first object 10 on the first main stage 320.

In detail, if the transfer unit 200 is aligned above the first main stage 320, the clamp driving member 260 may drive the paired clamping members of the clamp 230 to move close to each other, decreasing the clamp separation distance d. At the same time, the air blower 240 may blow air to the first object 10. The first object 10 may be bent to the first main stage 320 such that the center part of the first object 10 is mounted on the first main stage 320. After being mounted on the first main stage 320, the center part of the first object 10 may be sucked by the negative pressure produced by the first center suction holes 321a.

Once the center part of the first object 10 is sucked by the first center suction holes 321a, the clamp driving member 260 may drive the paired clamping members of the clamp 230 to move away from each other, increasing the clamp separation distance d. At the same time, the negative pressure applied to the transfer suction member 234 may be released, and the air blower 240 may blow air to the first object 10. In this manner, the first object 10 may be mounted on the first main stage 320 in the order from the center part to the edge thereof by means of the first peripheral suction holes 321b.

Figure 15:
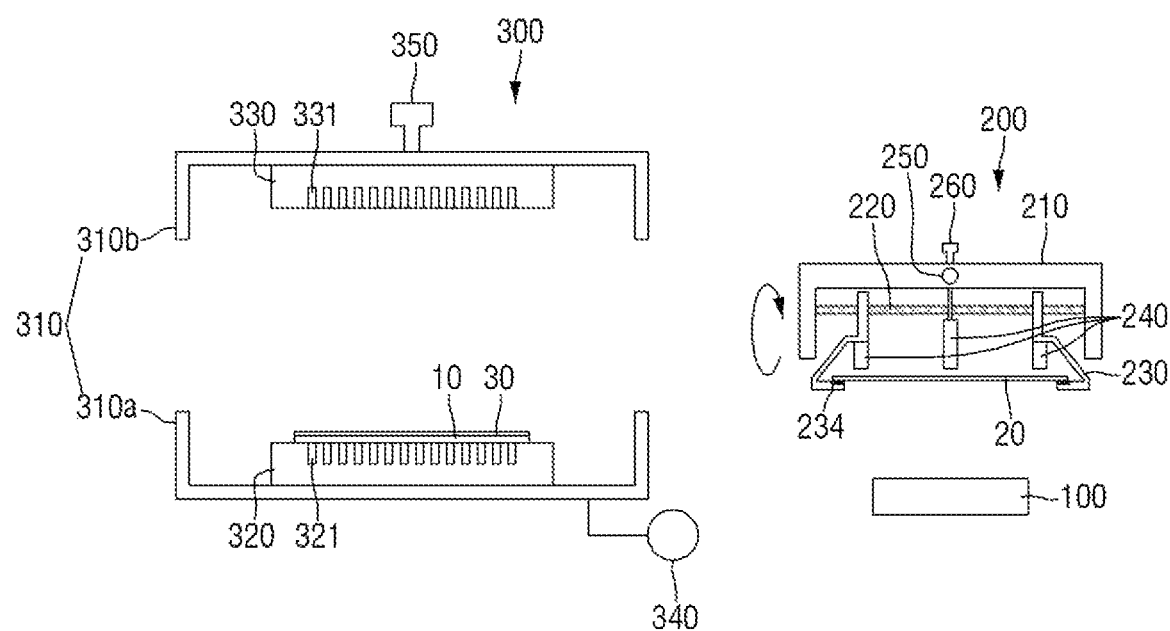
Figure 16:
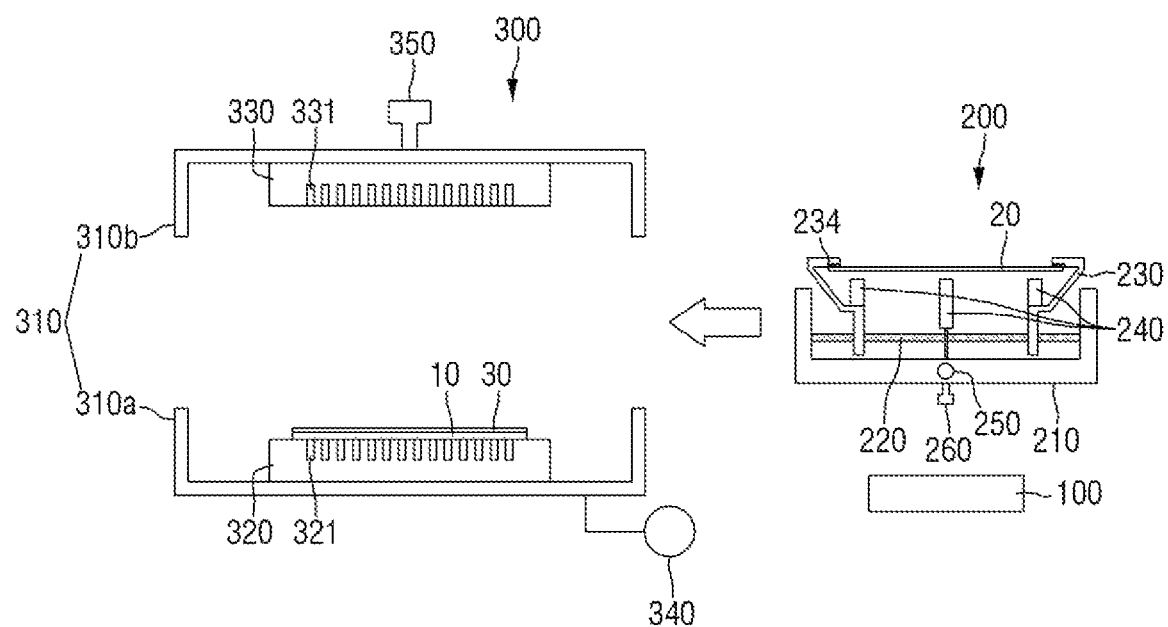
Figure 17:
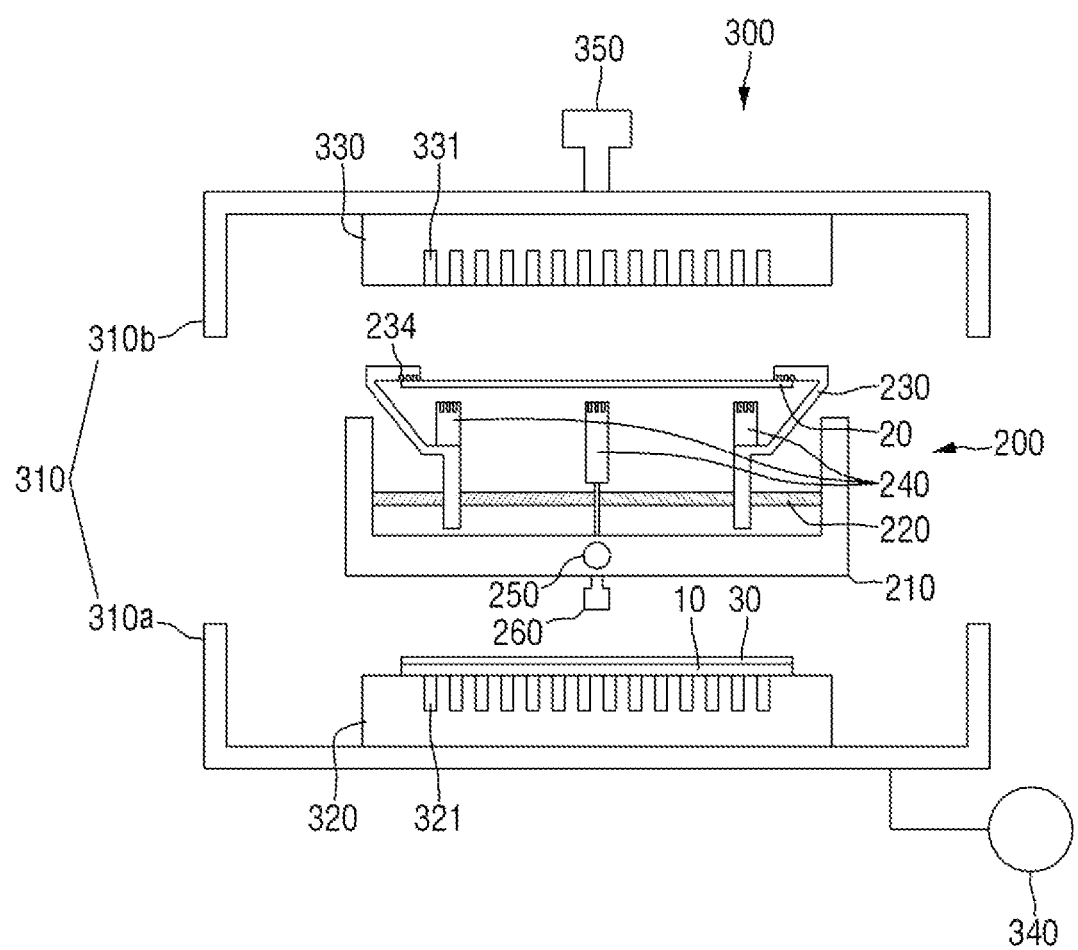
Figure 18:
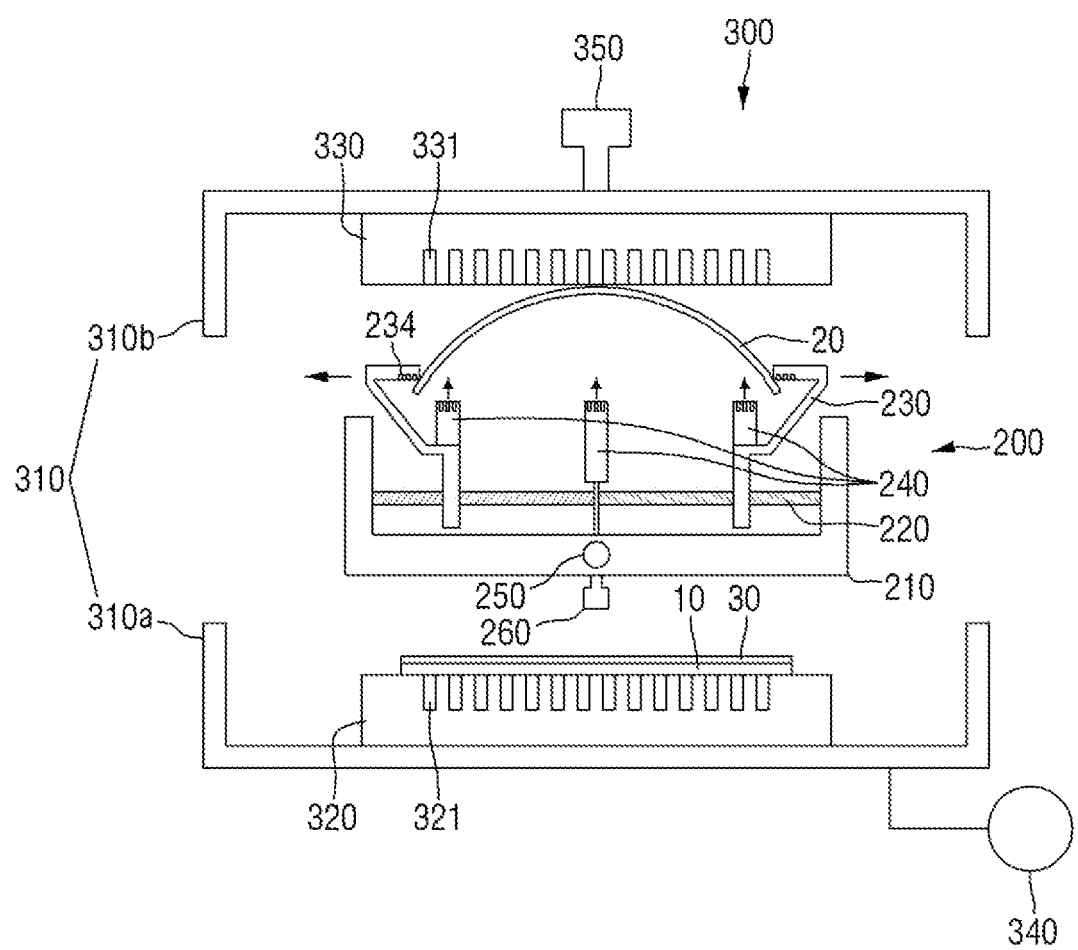
Figure 19:
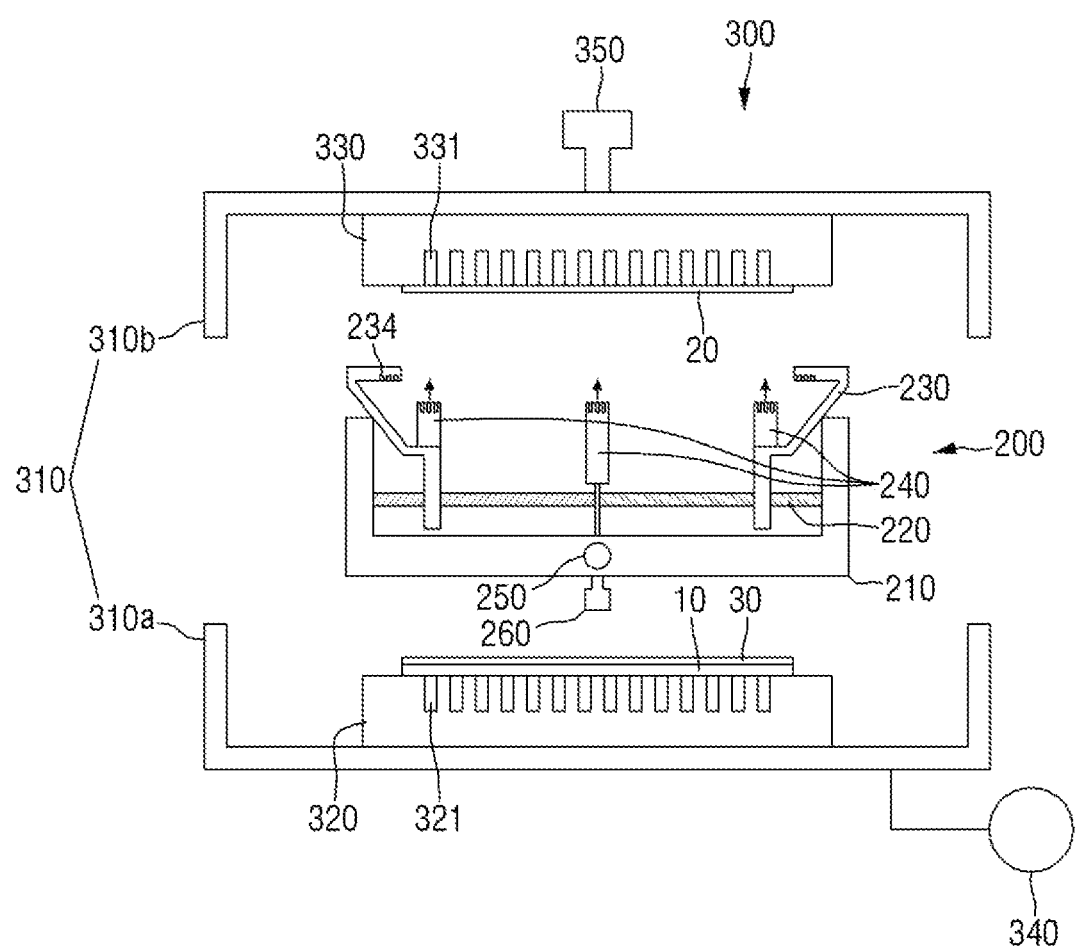

In reference to FIGS. 8, 15, and 19, mounting the lower surface of the first object on the first main stage at step S41 may be followed sequentially by arranging the second object on the sub-stage at step S51, sucking the lower surface of the second object to pick up the second object by means of the transfer suction member of the transfer unit and transferring the second object into the inside of the chamber at step S61, and mounting the lower surface of the second object on the second main stage at step S71.

The second object 20 may be mounted on the second main stage 330 in the same manner as the first object 10 being mounted on the first main stage 320, but the present disclosure is not limited thereto. The second object 20 may also be transferred into the chamber 300 by the same transfer unit 200 used for transferring the first object 10 or, without being limited thereto, a different transfer unit 200.

Although the description is made of the embodiment in which the first object 10 is arranged on the upper surface of the first main stage 320 while the second object 20 is arranged on the lower surface of the second main stage 330, the inventive concept is not limited thereto, and the first object 10 may be arranged on the lower surface of the second main stage 330 while the second object 20 may be arranged on the upper surface of the first main stage 320.

Figure 20:
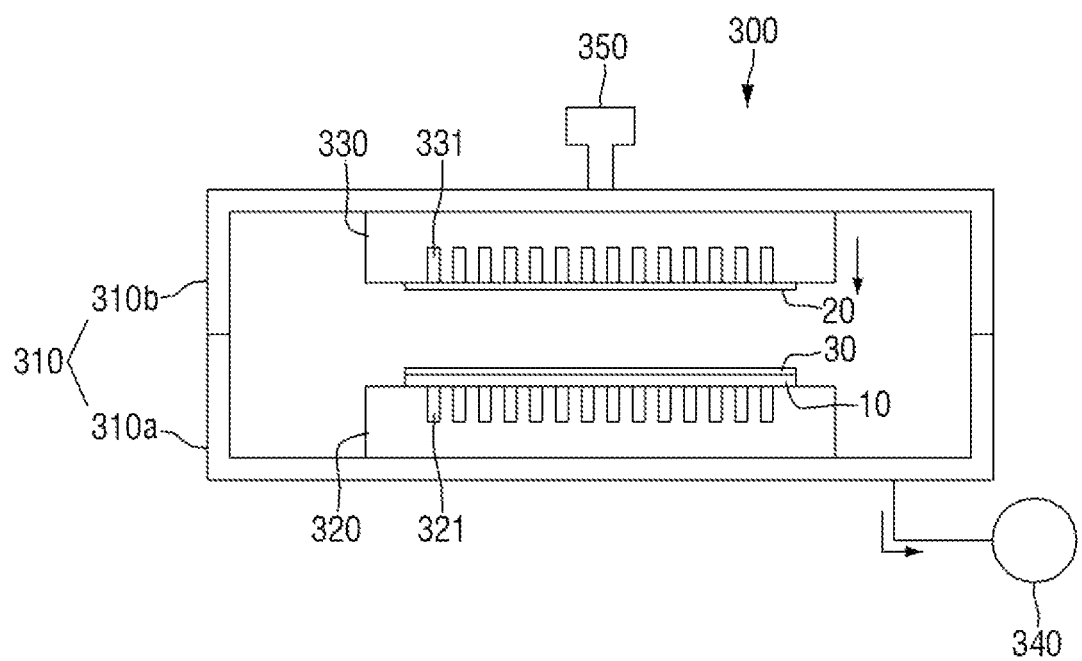
Figure 21:
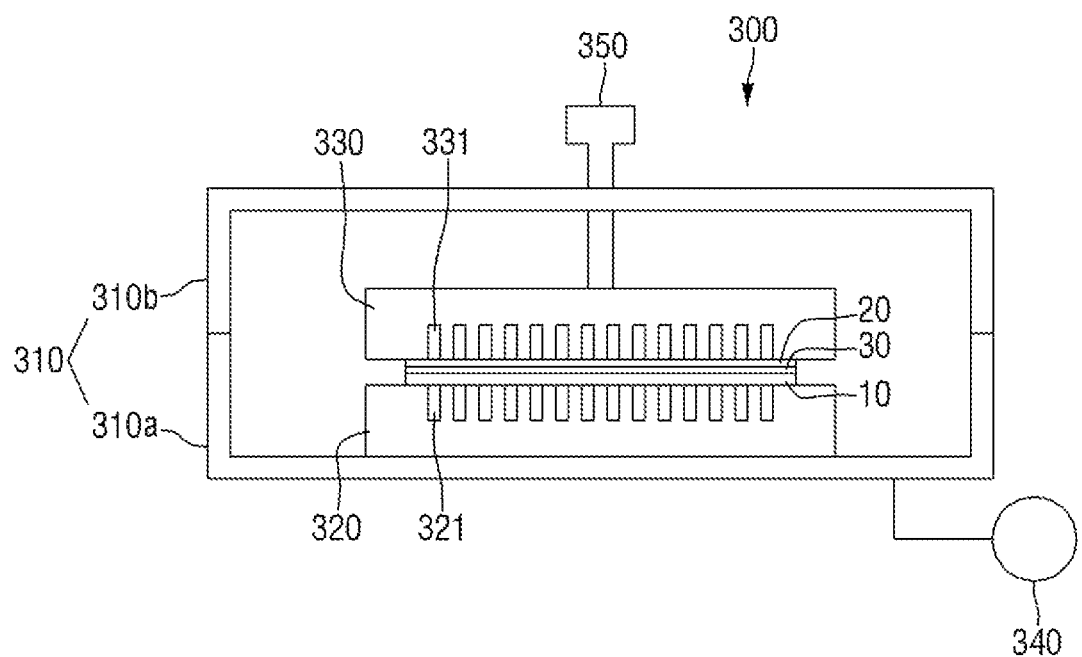

In reference to FIGS. 8, 20, and 21, mounting the lower surface of the second object on the second main stage at step S71 may be followed by adhering the first object and the second object at step S81.

The transfer unit 200 may move out of the chamber 300 through the space between the first chamber cover 310a and the second chamber cover 310b, and the first and second chamber covers 310a and 310b may be close to each other and fastened to each other.

Once the first and second chamber covers 310a and 310b are fastened to each other and thus, the inner space of the chamber is sealed, the vacuum module 340 may operate to produce a vacuum atmosphere in the inner space of the chamber 300. Once the vacuum atmosphere is produced to an extent sufficient for the adhesion process in the inner space of the chamber, the adhesion process for adhering the first object 10 and the second object 20 may be carried out.

At least one of the first and second main stages 210 and 220 may move up and down to adhere the first and second objects 10 and 20 together. The first and second objects 10 and 20 may be pressed to be adhered together. At this time, the adhesive layer 30 may be interposed between the first object 10 and the second object 20. However, the inventive concept is not limited thereto and, in the case where at least one of the first and second objects 10 and 20 includes an adhesive material in itself as described above, the adhesive layer 30 may be omitted.

Although not shown, the apparatus for manufacturing a display device according to an embodiment may further include, for example, an elastic sheet or a pressing pad for pressing the first object 10 and the second object 20. However, the inventive concept is not limited thereto, and the first object 10 may be adhered to the second object 20 in various ways.

The method for manufacturing a display device according to an embodiment may be possible to stably transfer the first and second objects 10 and 20 from the sub-stage 100 to the first and second main stages 320 and 330 in the chamber 300 and accurately adhere the first and second objects 10 and 20 to each other. This makes it possible to improve the reliability and display quality of the display device including the mutually adhered first and second objects 10 and 20.

Hereinafter, a description is made of an apparatus for manufacturing a display device according to another embodiment. In the following embodiments, a description of the same components as those of the above-described embodiment will be omitted or simplified, and differences will be mainly described.

The descriptions of other details identical with or similar to those described with reference to FIGS. 1 to 7 will be omitted hereinafter.

Figure 22:
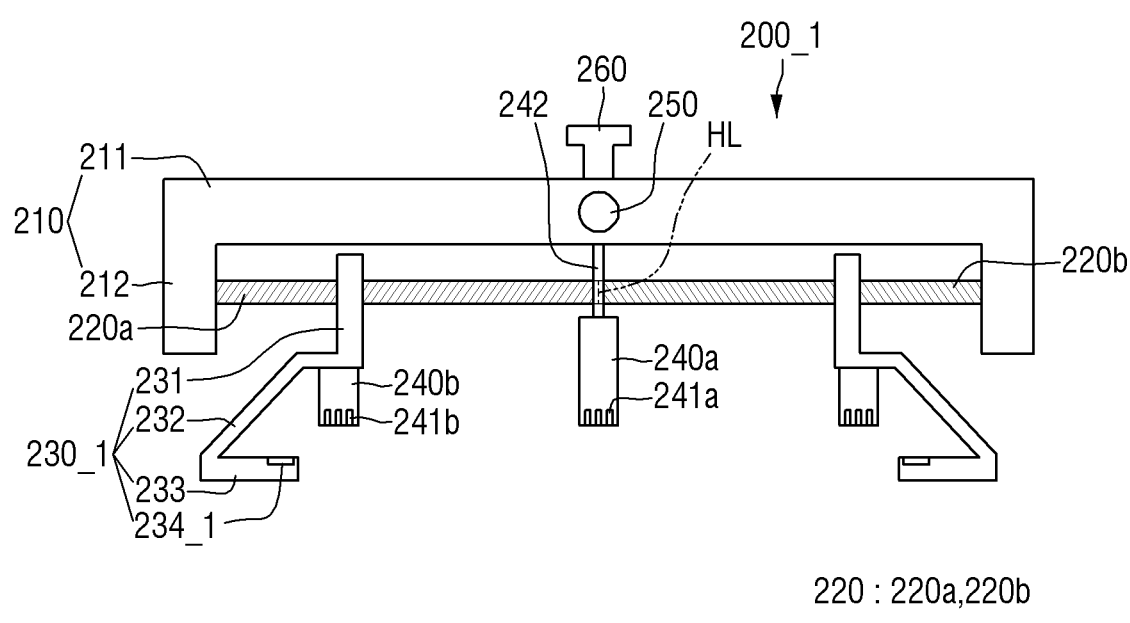
FIG. 22 is a schematic view showing a transfer unit according to another embodiment.

FIG. 22 is a schematic view showing a transfer unit according to another embodiment.

In reference to FIG. 22, a transfer unit 200_1 included in the apparatus for manufacturing a display device according to this embodiment may include a transfer electrostatic chuck 234_1. Unlike the transfer unit 200 using the transfer suction member 234 producing a negative pressure as a means for fixing and supporting the first object 10 in the embodiment of FIG. 3, the transfer unit 200_1 according to this embodiment may use the transfer electrostatic chuck 234_1 instead.

The transfer electrostatic chuck 234_1 may include a main body mad of ceramic and an electrode buried in the main body. The transfer electrostatic chuck 234_1 may operate so as to fix the first object 10 on the upper surface thereof when a high voltage is supplied from an external power source to the internal electrode.

The apparatus for manufacturing a display according to the embodiment may stably transfer the first and second objects 10 and 20 from the sub-stage 100 to the chamber 300 by means of the transfer unit 200_1. The first and second objects 10 and 20 transferred into the chamber 300 may be accurately adhered to each other. This may improve the reliability and display quality of the display device including the mutually adhered first and second objects 20.

Figure 23:
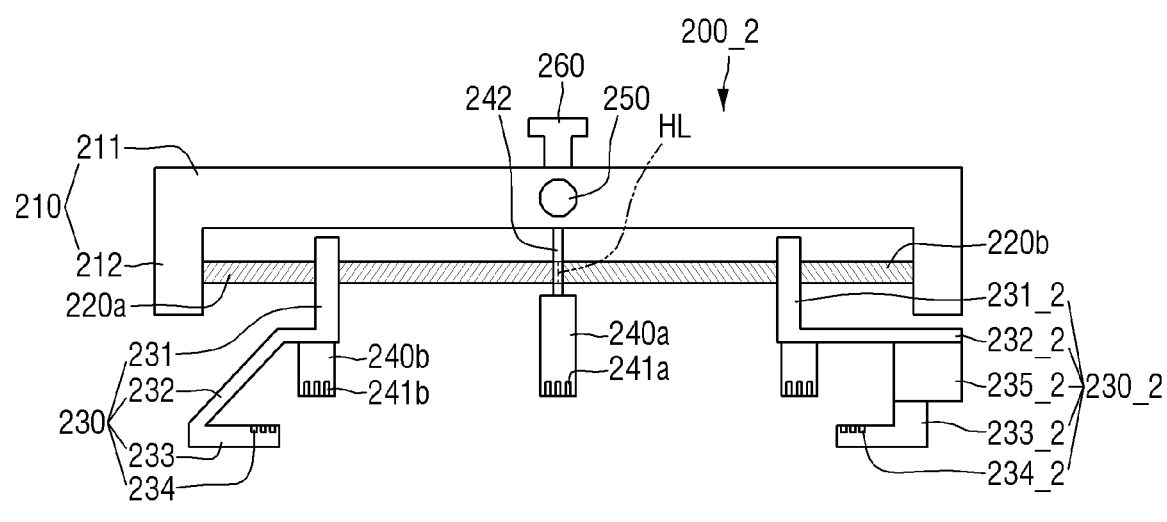
FIG. 23 is a schematic view showing a transfer unit according to still another embodiment.

FIG. 23 is a schematic view showing a transfer unit according to still another embodiment.

In reference to FIG. 23, a transfer unit 200_2 included in the apparatus for manufacturing a display device according to this embodiment may further include a transfer cylinder 235_2. In detail, at least one of the clamping members of the clamp 230_2 included in the transfer unit 200_2 according to this embodiment may include the transfer cylinder 235_2. The transfer cylinder 235_2 may increase the horizontal movement range of the transfer suction member 233_2 of the clamping member of the clamp 230_2. The transfer cylinder 235_2 may be configured to move along the longitudinal direction of the guide member 220. The transfer cylinder 235_2 may be arranged on the bottom of the connecting member 232)2, and the transfer suction member 233_2 may be arranged on the bottom of the transfer cylinder 235_2. The transfer suction member 233_2 may be connected to the transfer cylinder 235_2 so as to move horizontally along with the transfer cylinder 235_2. Accordingly, when the paired clamping members of the clamp 230_2 move in the opposite directions, the transfer unit 200_2 according to this embodiment may be able to increase the movement range of the transfer suction member 233_2 by means of the transfer cylinder 235_2, which may make it possible to pick up and transfer the objects 10 and 20 having an asymmetric shape.

The apparatus for manufacturing the display device according to this embodiment may stably transfer the first and second objects 10 and 20 from the sub-stage 100 to the chamber 300 by means of the transfer unit 200_2. The first and second objects 10 and 20 transferred into the chamber 300 may be accurately adhered to each other. This may improve the reliability and display quality of the display device including the mutually adhered first and second objects 10 and 20.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A method for manufacturing a display device, the method comprising:
   arranging a first object on a sub-stage;
   sucking the first object to pick up the first object by using a transfer unit;
   transferring the transfer unit into a chamber including a first main stage and a second main stage facing the first main stage;
   mounting the first object on the first main stage;
   arranging a second object on the sub-stage;
   sucking the second object to pick up the second object by using the transfer unit;
   transferring the transfer unit into the chamber;
   mounting the second object on the second main stage; and
   adhering the first object and the second object,
   wherein:
   each of the first object and the second object includes a lower surface, an upper surface opposite to the lower surface;
   a side surface perpendicular to the lower surface and the upper surface;
   the transfer unit does not contact the side surface of the first object and the side surface of the second object;
   the transfer unit includes a frame, a guide member installed on the frame, a clamp including a pair of clamp members installed on the guide member, and an air blower installed on the frame and each of the clamp members and configured to blow air; and
   each of the clamp members includes a suction member.

2. The method of claim 1, wherein:
   the sucking of the first object and the second object to pick up the first object and the second object by using the transfer unit comprises sucking the lower surface of the first object and the lower surface of the second object by using the suction member.

3. The method of claim 2, wherein:
   the first main stage includes a plurality of center suction holes located in its center part and peripheral suction holes located in its peripheral parts; and
   the mounting of the first object on the first main stage comprises reducing a separation distance between the pair of clamp members, blowing air toward the first object by using the air blower, and sucking the first object by using the center suction holes of the first main stage.

4. The method of claim 3, further comprising, after sucking the first object by means of the center suction holes of the first main stage, increasing a separation distance between the pair of clamp members, blowing air toward the first object by means of the air blower, and sucking the first object by using the peripheral suction holes of the first main stage.

5. The method of claim 3, wherein the mounting of the first object on the first main stage comprises sucking the first object onto the first main stage in the order from a center part to an edge of the first object.

6. The method of claim 2, wherein, in the sucking of the first object and the second object to pick up the first object and the second object by using the transfer unit, the side surfaces of the first object and the second object are exposed to an outside.

7. A method for manufacturing a display device, the method comprising:

arranging a first object on a sub-stage;
sucking the first object to pick up the first object by using a transfer unit;
transferring the transfer unit into a chamber including a first main stage and a second main stage facing the first main stage;
mounting the first object on the first main stage;
arranging a second object on the sub-stage;
sucking the second object to pick up the second object by using the transfer unit;
rotating the transfer unit;
transferring the transfer unit into the chamber;
mounting the second object on the second main stage; and
adhering the first object and the second object,
wherein:
each of the first object and the second object includes a lower surface, an upper surface opposite to the lower surface;
a side surface perpendicular to the lower surface and the upper surface; and
the transfer unit does not contact the side surface of the first object and the side surface of the second object.

8. The method of claim 7, wherein, in the rotating of the transfer unit, the transfer unit is rotated by 180 degrees.

* * * * *